United States Patent Office 3,743,492
Patented July 3, 1973

3,743,492
AMORPHOUS, NON-DEVITRIOUS FLUOROPHOSPHATE OPTICAL GLASS, FREE OF YELLOW COLORING AND PROCESS FOR PRODUCING THE SAME
Nobuyo Ogita, Tokyo, Japan, assignor to Hoya Glass Works, Shinjuku-ku, Tokyo, Japan
Filed Aug. 31, 1971, Ser. No. 176,451
Claims priority, application Japan, Aug. 31, 1970, 45/76,182, 45/76,183
Int. Cl. C03b 29/00
U.S. Cl. 65—32        6 Claims

ABSTRACT OF THE DISCLOSURE

Raw materials for a fluorophosphate optical glass are melted in a non-oxidizing atmosphere, and in particular, in a nitrogen gas atmosphere or in a covered melting vessel.

BACKGROUND OF THE INVENTION

Field of the invention

The present invention relates to a fluorophosphate optical glass prepared by a melting method and also to a process for the production of the fluorophosphate optical glass.

Description of the prior art

Hitherto, a fluorophosphate optical glass has been prepared by melting the raw materials for the optical glass in an open crucible.

In such a technique, in spite of the fact that the raw materials are melted at temperatures sufficiently higher than the temperatures for maintaining the raw materials at liquid phase, crystals are deposited in a short period of time to cause devitrification and simultaneously the glass prepared is greatly colored in yellow, which reduces greatly the quality of the glass. Accordingly, it is quite difficult by such a conventional method to produce a fluorophosphate optical glass having good quality.

That is, different from a devitrification phenomenon in an ordinary glass which occurs when the molten glass is maintained at the liquidus temperature range or when the composition of the glass is largely varied by the volatilization of the components, the devitrification occurs in a fluorophosphate optical glass, even when the glass is melted at sufficiently higher temperatures than the liquid-phase temperature. This phenomenon is peculiar to the fluorophosphate glass and is believed to be due to the fact that the fluorides contained largely in the composition of the fluorophosphate glass are converted into oxides.

As the result of various investigations of overcoming various difficulties in the production of the fluorophosphate optical glass, the inventor has discovered a method for preventing the deposition of devitrifying matter and the yellow coloring the glass so produced.

That is, it has been discovered that by melting the raw materials for the fluorophosphate optical glass in a non-oxidizing atmosphere, the devitrification and coloring of the fluorophosphate optical glass can be effectively prevented. In other words, when the raw materials for the fluorophosphate optical glass are melted in a non-oxidizing atmosphere or an oxygen-free atmosphere in a covered melting vessel, the occurrence of devitrification and coloring is remarkably prevented and also, the variation of the composition due to the volatilization of the components can be prevented. In this case, better results are obtained by employing a nitrogen gas atmosphere as the non-oxiding atmosphere.

SUMMARY OF THE INVENTION

An object of this invention is, therefore, to provide a fluorophosphate optical glass having no devitrification and yellow coloring.

Another object of this invention is to provide a process for producing the fluorophosphate optical glass without the accompanying occurrences of devitrification and yellow coloring.

These and other objects of this invention will become apparent from the following disclosure.

DETAILED DESCRIPTION OF THE INVENTION

Figure 1:
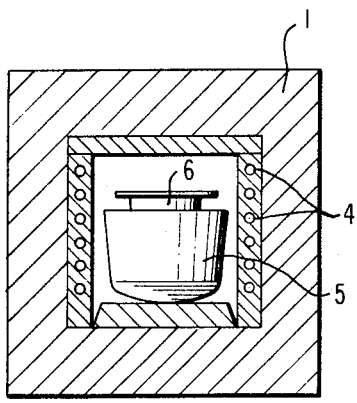
FIG. 1 is a cross-sectional front view showing an embodiment of a glass melting furnace used in the practice of this invention.

According to the present invention, the fluorophosphate optical glass is produced by melting the raw materials of the fluorophosphate optical glass in an non-oxidizing atmosphere, and preferably in a nitrogen gas atmosphere or melting them in a melting vessel in a furnace under an oxygen-free condition by covering the vessel.

In order to provide a nitrogen gas atmosphere to a melting furnace, air in the furnace is first replaced with a nitrogen gas and then a nitrogen gas may be continuously supplied into the furnace to such an extent that the entrance of air can be prevented. Alternatively, after melting the glass raw materials in a melting furnace, a nitrogen gas may be continuously supplied to the furnace.

DETAILED DESCRIPTION OF THE DRAWING

Figure 3:
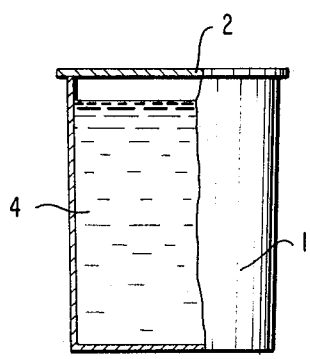
FIG. 3 is a partial sectional view showing an embodiment of a cover closing a glass melting crucible used in the practice of this invention.
Figure 4:
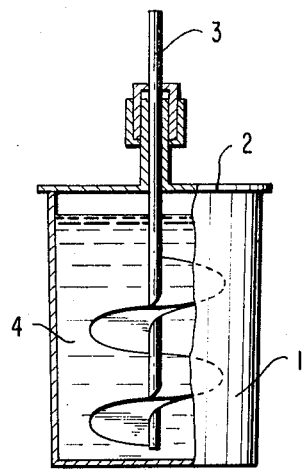
FIG. 4 is a partial sectional view showing another embodiment of a cover closing a glass melting furnace.

The cover of the melting crucible is illustrated in FIG. 3 or FIG. 4 and is preferably made of platinum or a platinum alloy. In the example shown in FIG. 3, a cover 2 is applied to a crucible 1 and in the other example shown in FIG. 4, a cover 2 equipped with an agitator 3 is applied to a crucible 1. The space between the cover and the level of molten glass in the crucible has been filled with the volatilized gases of the components in the glass composition and no oxygen is present there. There may be some gaps between the edge of the crucible and the cover but in the case of melting the raw materials of the fluorophosphate optical glass, the gaps are closed by initially volatilized materials and hence the effect of the cover is markedly larger in case of producing the fluorophosphate optical glass than in case of producing ordinary glasses.

Now, without limiting this invention, the following examples are given to further illustrate the preferred embodiments of this invention.

EXAMPLE 1

Figure 2:
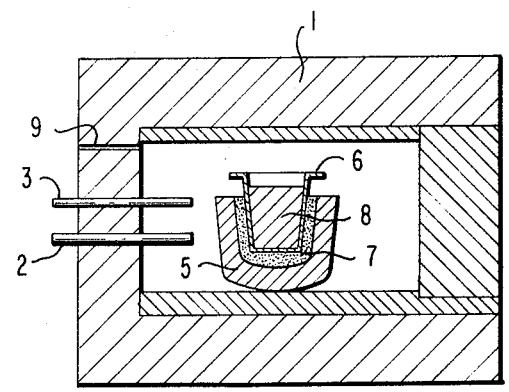
FIG. 2 is a cross-sectional side view of the glass melting furnace shown in FIG. 1.

The raw materials for the fluorophosphate optical glass having the following composition were melted in the furnace as shown in FIG. 1 and FIG. 2 of the accompanying drawings.

Glass composition

| | |
|---|---:|
| ½$P_2O_5$ | 25.0 |
| $AlF_3$ | 21.6 |
| $MgF_2$ | 8.2 |
| $BaF_2$ | 15.2 |
| $CaF_2$ | 15.0 |
| ½$B_2O_3$ | 4.0 |
| NaF | 11.0 |

In the above composition each component is shown by the cationic percentage.

As shown in the figures the furnace used was an ordinary cubic closed furnace 1 and a nitrogen gas was introduced in the furnace through a conduit 2 to provide a nitrogen gas atmosphere to the inside of the furnace. The temperature of the furnace was measured by means of a thermocouple 3 inserted through a back wall of the furnace. In the embodiment shown, a heater 4 was provided to the inside wall of the furnace and a gas outlet 9 was formed in the wall of the furnace. The glass raw materials 8 were charged in a platinum crucible 6 and the latter was placed in a clay crucible 5 with alumina powder 7 between the both crucibles.

After replacing air in the furnace with nitrogen gas, the raw materials of glass were melted for 8 hours at 1000° C. with stirring while supplying a fresh nitrogen gas into the furnace. Thereafter, the molten glass was cooled to 700° C. and casted in a metallic mold preheated.

Upon comparing the glass produced by melting the raw materials in the aforesaid manner with a glass produced by melting in an ordinary air atmosphere, there were clear differences between them. That is, when the raw materials were melted at 1000° C. in an air atmosphere, crystalline materials were greatly deposited after about 16 hours to cause devitrification. Moreover, the glass produced exhibited a yellow color. On the other hand, when they were melted at 1000 C. in a nitrogen gas atmosphere in accordance with this invention, neither devitrification nor coloring occurred, even after 30 hours.

EXAMPLE 2

The raw materials of the fluorophosphate optical glass having the following composition were melted in the crucible with a cover as shown in FIG. 3 and FIG. 4.

Glass composition

| | |
|---|---|
| $\frac{1}{2}P_2O_5$ | 25.0 |
| $AlF_3$ | 21.6 |
| $MgF_2$ | 8.2 |
| $BaF_2$ | 15.2 |
| $CaF_2$ | 15.0 |
| $\frac{1}{2}B_2O_3$ | 4.0 |
| $NaF$ | 11.0 |

In the above composition, each component was shown by the cationic percentage.

The raw materials were melted in the covered crucible for about 8 hours at 1000° C. with stirring, then cooled to 700° C., and casted in a metallic mold preheated.

Upon comparing the glass produced by melting the raw materials in the aforesaid method and a glass produced by melting a conventional open crucible, there were established clear differences between them. That is, when they were melted in the open crucible at 1000° C., crystalline materials were deposited greatly after 16 hours and the glass produced was colored yellow. On the other hand, when they were melted in the covered crucible at 1000° C., neither devitrification nor coloring occurred after 30 hours.

As mentioned above by referring to the examples, it will be understood that this invention gives very remarkable results when compared to the prior art. This is believed to be due to the fact that when the melting is performed in a nitrogen gas atmosphere, the atmosphere consisting of the nitrogen gas contributes to suppress the formation and growth of crystals. Furthermore, in the case of employing the covered melting crucible, the aforesaid excellent results are believed to be caused by applying the cover to the crucible, in which the space between the cover and the level of the molten glass in the crucible becomes a non-oxidizing atmosphere or an oxygen-free atmospheree, which suppresses the conversion of the fluorides in the molten glass into oxides and thus contributes to suppress the formation and growth of crystals.

As mentioned above, by melting the raw materials for a fluorophosphate optical glass according to the process of this invention, the occurrences of devitrification and coloring of the glass can be prevented and a fluorophosphate optical glass having a good quality can be obtained.

Although the present invention has been adequately described in the foregoing specification and examples included therein, it is readily apparent that various changes and modifications can be made without departing from the spirit and scope thereof.

I claim:

1. In a process for producing an amorphous, non-devitrious fluorophosphate optical glass, free of yellow coloring, which comprises melting the raw materials of $\frac{1}{2}P_2O_5$, $AlF_3$, $MgF_2$, $BaF_2$, $CaF_2$, $\frac{1}{2}B_2O_3$ and $NaF$ for the fluorophosphate optical glass and molding the thus melted raw materials, the improvement which comprises:

conducting the steps of melting said raw materials and molding said raw materials for the fluorophosphate optical glass in the presence of a non-oxidizing atmosphere, said melting step taking place at a temperature of about 1000° C., and said molding step occurring when said melted raw materials have cooled to a temperature of about 700° C., said melting occurring over a period of time sufficient to melt the raw materials.

2. The process of claim 1, wherein said melted and cooled raw materials are subsequently cased in a preheated metallic mold.

3. The process of claim 1, wherein said raw materials are melted over a period of about up to 8 hours.

4. The process of claim 1, wherein said non-oxidizing atmosphere is a nitrogen gas atmosphere.

5. The process of claim 4, wherein said nitrogen gas atmosphere is formed by replacing air in a melting furnace with a nitrogen gas and then supplying continuously a nitrogen gas to the furnace to such an extent as to prevent the entrance of air.

6. The process of claim 1, wherein said non-oxidizing atmosphere is formed by covering a melting vessel, said covering sufficient to exclude an oxidizing atmosphere.

References Cited

UNITED STATES PATENTS

| | | | |
|---|---|---|---|
| 3,492,136 | 11/1970 | Bromer et al. | 106—47 Q |
| 3,459,522 | 8/1969 | Elmer et al. | 65—32 X |
| 2,612,726 | 10/1952 | Nordberg | 65—32 |
| 3,222,142 | 12/1965 | Shell et al. | 65—32 X |
| 3,317,298 | 5/1967 | Klump et al. | 65—32 |
| 2,387,222 | 10/1945 | Wright | 65—32 |
| 3,656,924 | 4/1972 | Chapman et al. | 65—134 X |
| 3,531,305 | 9/1970 | Dumbaugh, Jr. | 65—134 X |
| 3,531,306 | 9/1970 | Dumbaugh, Jr. | 65—134 X |

FRANK W. MIGA, Primary Examiner

U.S. Cl. X.R.

65—134; 106—47 Q